(12) United States Patent
Liu et al.

(10) Patent No.: US 12,043,560 B2
(45) Date of Patent: Jul. 23, 2024

(54) METHOD FOR PREDICTING OPERATION EFFECTIVENESS OF DECENTRALIZED SEWAGE TREATMENT FACILITY BY USING SUPPORT VECTOR MACHINE

(71) Applicant: YANGTZE DELTA REGION INSTITUTE OF TSINGHUA UNIVERSITY, ZHEJIANG, Zhejiang (CN)

(72) Inventors: Rui Liu, Zhejiang (CN); Qiangqiang Yu, Zhejiang (CN); Lujun Chen, Zhejiang (CN)

(73) Assignee: YANGTZE DELTA REGION INST. OF TSINGHUA UNIVERSITY, Jiaxing (CN)

( * ) Notice: Subject to any disclaimer, the term of this patent is extended or adjusted under 35 U.S.C. 154(b) by 453 days.

(21) Appl. No.: 17/615,631

(22) PCT Filed: Mar. 9, 2020

(86) PCT No.: PCT/CN2020/078401
§ 371 (c)(1),
(2) Date: Dec. 1, 2021

(87) PCT Pub. No.: WO2020/244265
PCT Pub. Date: Dec. 10, 2020

(65) Prior Publication Data
US 2022/0316994 A1    Oct. 6, 2022

(30) Foreign Application Priority Data
Jun. 6, 2019 (CN) .......................... 201910491864.0

(51) Int. Cl.
*C02F 3/00* (2023.01)
*C02F 3/12* (2023.01)
(Continued)

(52) U.S. Cl.
CPC ............ *C02F 3/006* (2013.01); *C02F 3/1263* (2013.01); *C02F 3/30* (2013.01); *C02F 3/327* (2013.01);
(Continued)

(58) Field of Classification Search
USPC ....................................................... 702/183
See application file for complete search history.

(56) References Cited

U.S. PATENT DOCUMENTS 6,408,227 B1 * 6/2002 Singhvi ................ G05B 13/027
700/32
2011/0257788 A1 * 10/2011 Wiemers ................... C02F 1/42
700/271

(Continued)

FOREIGN PATENT DOCUMENTS

CN    107977724 A    5/2018
CN    108665119 A    10/2018

(Continued)

OTHER PUBLICATIONS

Sun et al., "Application of Support Vector Machine in Classification and Evaluation of Water Resources Quality" Journal of Shaoyang University (Natural Science Edition), Jun. 30, 2016, vol. 13, No. 2, pp. 11-15.

(Continued)

*Primary Examiner* — Paul D Lee
(74) *Attorney, Agent, or Firm* — MagStone Law, LLP; Enshan Hong

(57) ABSTRACT

A method for predicting operation effectiveness of a decentralized sewage treatment facility by using a support vector machine, comprising: simultaneously collecting an influent conductivity and an effluent conductivity, and recording operation effectiveness of the decentralized sewage treatment facility; training a training set by using the support
(Continued)

vector machine, with the influent conductivity and effluent conductivity as input and the operation effectiveness of decentralized sewage treatment facilities as output, so as to construct a prediction model for the operation effectiveness of decentralized sewage treatment facilities; and collecting the influent conductivity and effluent conductivity of the treatment facilities to be predicted, and inputting them into the prediction model to obtain a predictive result. The method is not only highly accurate, but fast and inexpensive.

7 Claims, 4 Drawing Sheets

(51) Int. Cl.
*C02F 3/30* (2023.01)
*C02F 3/32* (2023.01)
*G01M 99/00* (2011.01)
*G06N 20/10* (2019.01)

(52) U.S. Cl.
CPC .......... *G01M 99/00* (2013.01); *G01M 99/005* (2013.01); *G01M 99/008* (2013.01); *G06N 20/10* (2019.01); *C02F 2209/05* (2013.01); *C02F 2209/08* (2013.01); *C02F 2209/10* (2013.01); *C02F 2209/14* (2013.01); *C02F 2209/16* (2013.01); *C02F 2209/18* (2013.01)

(56) References Cited

U.S. PATENT DOCUMENTS

| | | | |
|---|---|---|---|
| 2018/0164272 A1* | 6/2018 | Han | .................. G06N 3/088 |
| 2018/0194642 A1* | 7/2018 | Ukai | .................. C02F 9/00 |

FOREIGN PATENT DOCUMENTS

| | | |
|---|---|---|
| CN | 208436519 U | 1/2019 |
| CN | 109534501 A | 3/2019 |
| CN | 110132629 A | 8/2019 |
| JP | 2006110482 A | 4/2006 |
| JP | 5283831 B2 | 9/2013 |

OTHER PUBLICATIONS

International Application No. PCT/CN2020/078401, International Search Report and Written Opinion mailed Jun. 2, 2020, 17 pages.

* cited by examiner

METHOD FOR PREDICTING OPERATION EFFECTIVENESS OF DECENTRALIZED SEWAGE TREATMENT FACILITY BY USING SUPPORT VECTOR MACHINE

PRIORITY CLAIM

This is a U.S. national stage of application No. PCT/CN2020/078401, filed on Mar. 9, 2020. Priority is claimed on the following application: Country: China, Application No.: 201910491864.0, Filed: Jun. 6, 2019, the entire content of which is incorporated here by reference.

TECHNICAL FIELD

The present invention relates to the technical field of wastewater treatment, and more particularly, to a method for predicting operation effectiveness of a decentralized sewage treatment facility by using a support vector machine.

BACKGROUND ART

With the rapid development of rural economy, the living standards of farmers have been greatly improved. However, the rural environment construction is not synchronized with the economic development, with a particularly serious problem of water environmental pollution. Now people pay more attention to the treatment of rural sewage. China has constructed a large number of decentralized sewage treatment facilities with small scale, due to the rural domestic sewage having the characteristics of small amount of water and dispersed discharge. The amount of sewage treated per day is typically a few tons to several hundred tons. The geographical locations are highly dispersed, and the number of facilities in each county can reach hundreds of units. The long-term operation of these facilities is particularly important for the treatment of rural domestic sewage and the improvement of rural environment.

At present, the operation and management of these decentralized treatment facilities mainly rely on manual work. We cannot quickly judge the effectiveness of the facilities, especially for the removal of COD, ammonia nitrogen, TP and other major pollutants in sewage. If the water quality indexes are monitored based on the national standard method, the sampling and water quality testing have high cost, long period and large workload in the supervision process. It is difficult to indicate the operation effectiveness of the facilities in real time.

For a large number of decentralized sewage treatment facilities with distributed locations, it may cause huge the workload of sampling and water quality testing. Moreover, the detection cost is high and the timeliness is poor based on the national standard method. It is impossible to adjust the decentralized sewage treatment facilities by obtaining real-time effluent results. The rapid detection device of COD, ammonia nitrogen and other indexes based on spectroscopic methods is not only expensive, but also has a certain error with the national standard method. Therefore, when the effluent quantity results was obtained by these rapid detection instruments, the judgment precision of effectiveness are often limited due to the accumulated error.

Therefore, it is difficult to judge the operation effectiveness of the decentralized sewage treatment facilities by the aforementioned monitoring methods.

SUMMARY OF THE INVENTION

The present invention provides a method for predicting operation effectiveness of a decentralized sewage treatment facility by using a support vector machine, wherein a detection index of influent conductivity and effluent conductivity is correlated with the operation effectiveness of the decentralized sewage treatment facility, and a support vector machine model is constructed to obtain a prediction model. The present invention is not only highly accurate, but also fast and inexpensive.

The specific technical solution is as follows.

A method for predicting operation effectiveness of a decentralized sewage treatment facility by using a support vector machine comprises the steps of:

(1) selecting a plurality of decentralized sewage treatment facilities as a training set; simultaneously collecting an influent conductivity and an effluent conductivity of the decentralized sewage treatment facilities in the training set; and recording operation effectiveness of the corresponding decentralized sewage treatment facilities;

(2) training the training set by using the support vector machine, with the influent conductivity and effluent conductivity as input and the operation effectiveness of decentralized sewage treatment facilities as output, so as to construct a prediction model for the operation effectiveness of decentralized sewage treatment facilities; and (3) collecting the influent conductivity and effluent conductivity of the decentralized sewage treatment facilities to be predicted, inputting same into the prediction model obtained in step (2), and obtaining a predictive result.

In the present invention, the rural domestic sewage refers to sewage generated by the living of rural residents, and specifically includes three types of sewage, namely, manure and urine sewage after septic tank treatment, kitchen sewage and laundry sewage. The main pollutants are COD, total nitrogen, ammonia nitrogen, total phosphorus and suspended solids (SS). The decentralized sewage treatment facility refers to a treatment setting for treating rural domestic sewage.

It is found that for the decentralized sewage treatment facilities above, there is a correlation between the influent and effluent conductivities and the operation effectiveness of decentralized sewage treatment facilities. The influent and effluent conductivities can be used as inputs to the support vector machine model for training according to the operation results of decentralized sewage treatment facilities. A prediction model for the operation effectiveness of decentralized sewage treatment facilities can be constructed to predict the operation effectiveness of decentralized sewage treatment facilities.

In order to ensure that the predictive result of the prediction model is more accurate, in step (1), the number of samples in the training set is at least greater than 120-150.

Since the conductivity value is related to the water temperature, it is common in the art to use the conductivity value at the water temperature of 20° C. or 25° C. as a reference for correction, and it is generally automatically corrected. In the present invention, it is only necessary to ensure that the same standard is used for the measured conductivity.

The decentralized sewage treatment facility of the present invention is at least one of an $A^2O$ treatment facility, an constructed wetland treatment facility, a sequencing batch reactor (SBR) treatment facility, and an aeration filter treatment facility. The above-mentioned decentralized sewage treatment facility is composed of two parts, namely, an influent regulation tank and a sewage treatment device; and an discharge outlet is set after the sewage treatment device.

in step (1), the operation effectiveness is an effective operation or an ineffective operation;

wherein the method for judging the effective operation and the ineffective operation includes that if the removal rate of the decentralized sewage treatment facility for any one of the indexes of COD, ammonia nitrogen, total phosphorus and suspended solids in the rural domestic sewage is ≥a percentage threshold, and there is no case that the effluent concentration of any two indexes of COD, ammonia nitrogen, total nitrogen and total phosphorus is greater than the influent concentration, it is judged as effective operation; otherwise, it is an ineffective operation; and the percentage threshold is 20%-70%.

The percentage threshold can be set according to the actual situation. It is found by experiments that the setting of the size of the percentage threshold does not affect the applicability of the method of the present invention.

Further, in step (1), the influent conductivity is measured in a regulation tank of a decentralized sewage treatment facility, and the measurement time is 15 min after a lifting pump in the regulation tank is turned on;

the effluent conductivity is measured in an discharge outlet of the decentralized sewage treatment facility, and is simultaneously measured with the influent conductivity;

the determination method for the influent conductivity and the effluent conductivity includes collecting water samples in the regulation tank or in the discharge outlet to determine conductivity values; alternatively, the water in the regulation tank or in the discharge outlet is directly measured by an on-line conductivity meter.

Preferably, after 15 min on starting up the lifting pump, the influent conductivity and the effluent conductivity are respectively measured once; and thereafter the influent conductivity and the effluent conductivity are respectively measured once every 15 minutes for a total of 3-4 consecutive times, with an average value respectively taken as the influent conductivity value and the effluent conductivity value in the detection stage;

the concentrations of COD, ammonia nitrogen, total nitrogen, total phosphorus and suspended solids in the regulation tank and the discharge outlet of the decentralized sewage treatment facility are respectively determined at the same time of detecting the influent conductivity and the effluent conductivity each time, and the average values of the concentrations of each pollutant in the influent and the effluent are calculated as the concentrations of COD, ammonia nitrogen, total nitrogen, total phosphorus and suspended solids in the detection stage, which are used for judging the operation effectiveness of the decentralized sewage treatment facility.

Furthermore, in step (2), the influent conductivity and the effluent conductivity are respectively substituted into a mapminmax function for normalization processing, and then input into a support vector machine;

the formula for the mapminmax function is $y=(x-x_{min})/(x_{max}-x_{min})$ (1);

in formula (1), y is the measured data of the influent conductivity or the effluent conductivity after the normalization treatment; x is the measured data of the influent conductivity or the effluent conductivity before the normalization treatment; $x_{min}$ is a minimum value of x; $x_{max}$ is a maximum value of x; and the effective decentralized sewage treatment facility is marked as 1, and the ineffective decentralized sewage treatment facility is marked as −1.

Further, in step (2), a model is trained by using a Libsvm toolbox, the training comprising optimization of a penalty parameter c and a RBF kernel parameter g; and The optimization is performed according to K-CV cross-validation combined with grid optimization, and specifically including: performing two-round optimization on the penalty parameter c and the kernel function parameter g by using a SVMcgForClass function, thereby acquiring an optimal solution to the penalty parameter c and the kernel function parameter g.

The present invention have the following advantageous effects compared to the prior art.

(1) The method of the present invention relates a detection index of the conductivity of the influent conductivity and effluent conductivity with the operation effectiveness of the decentralized sewage treatment facility, and constructs a support vector machine model to obtain a prediction model; and it is not only highly accurate, but also fast and inexpensive.

(2) Compared with conventional standard detection methods (fastest time required is about 30 min), the prediction method of the present invention can achieve rapid prediction and facilitate the subsequent facility regulation.

DETAILED DESCRIPTION OF PREFERRED EMBODIMENTS OF THE INVENTION

Figure 1:
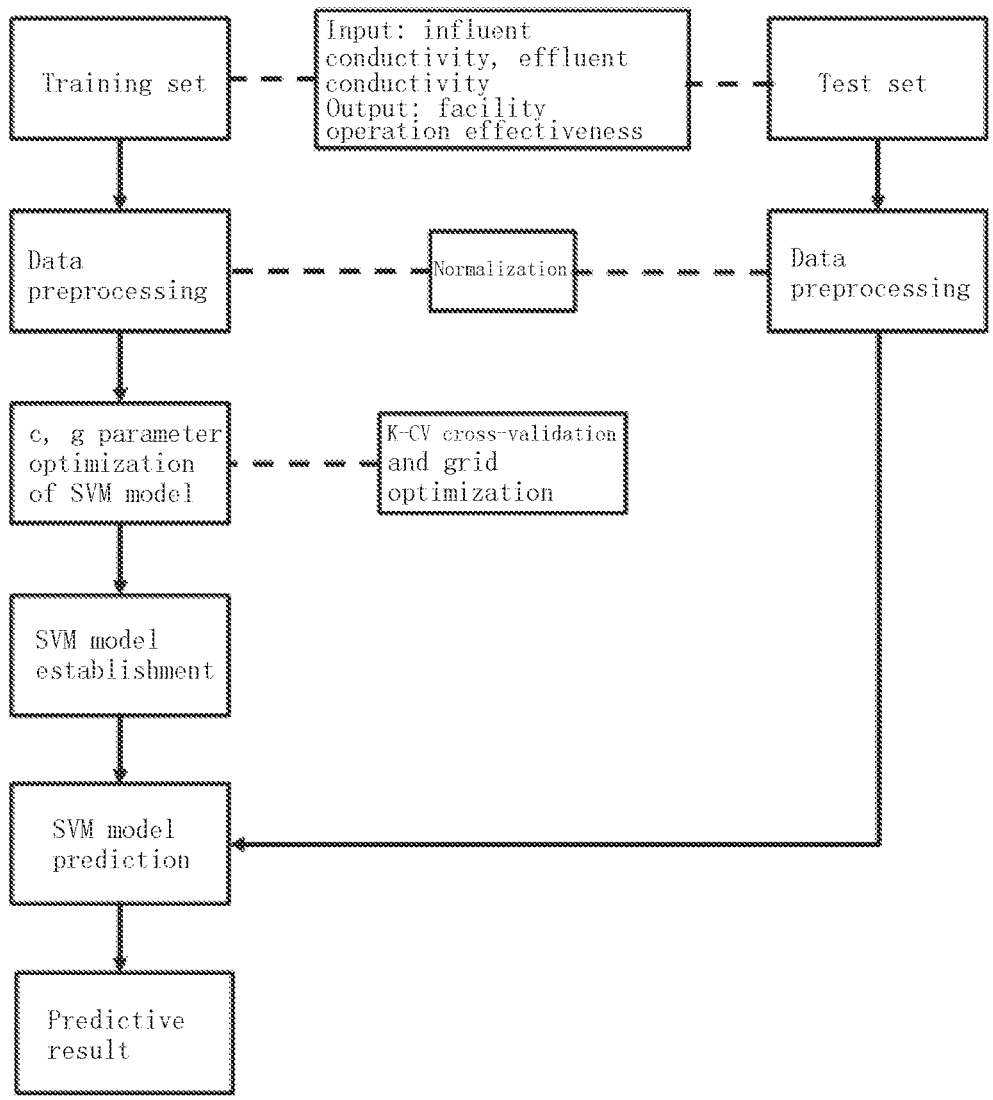
FIG. 1 is a flowchart of a method for predicting operation effectiveness of a decentralized sewage treatment facility by using a support vector machine according to the present invention.
Figure 2:
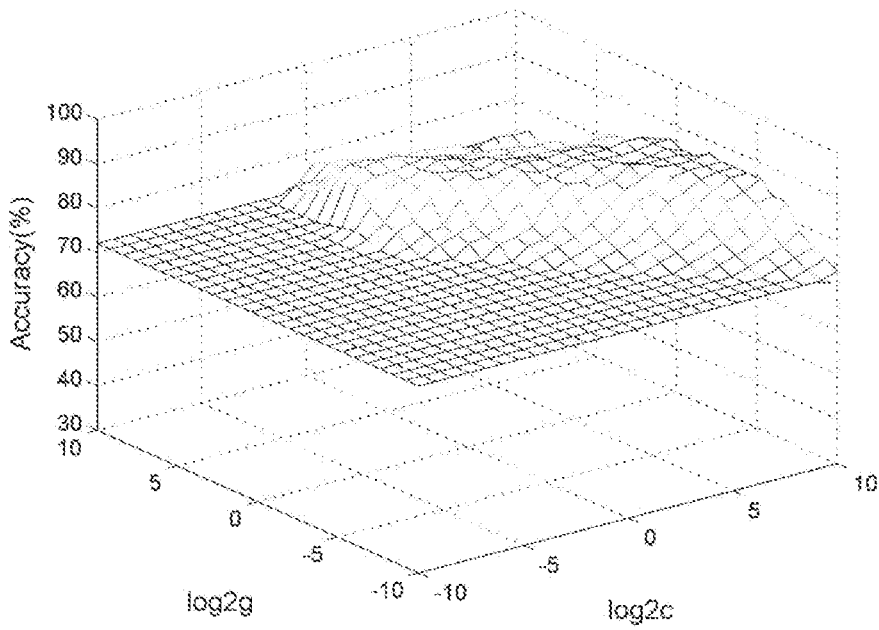
FIG. 2 is a graph showing selection results of an optimal penalty parameter c and a kernel function parameter g in a rough selection process in Embodiment 1.
Figure 3:
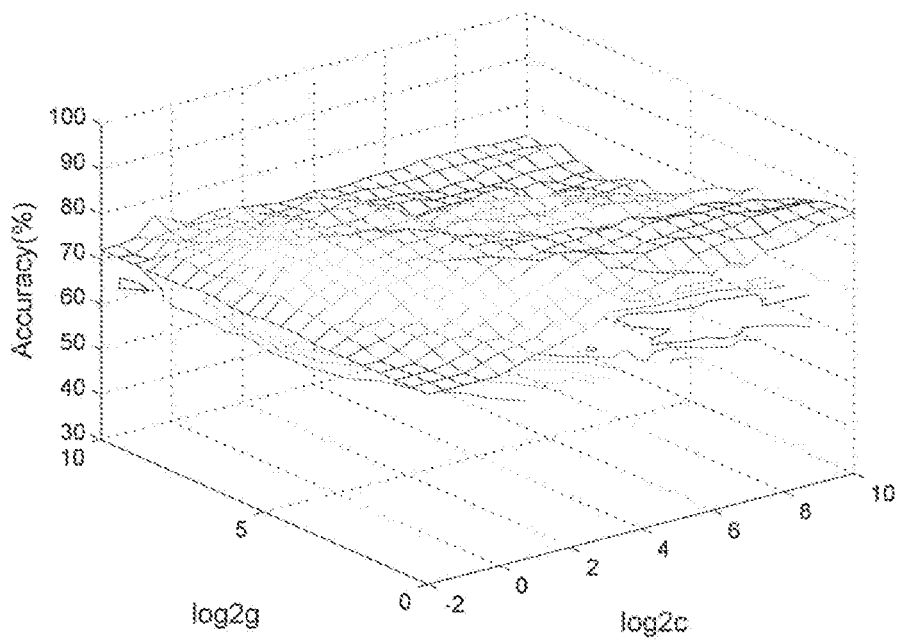
FIG. 3 is a graph showing selection results of an optimal penalty parameter c and a kernel function parameter g in a fine selection process in Embodiment 1.
Figure 4:
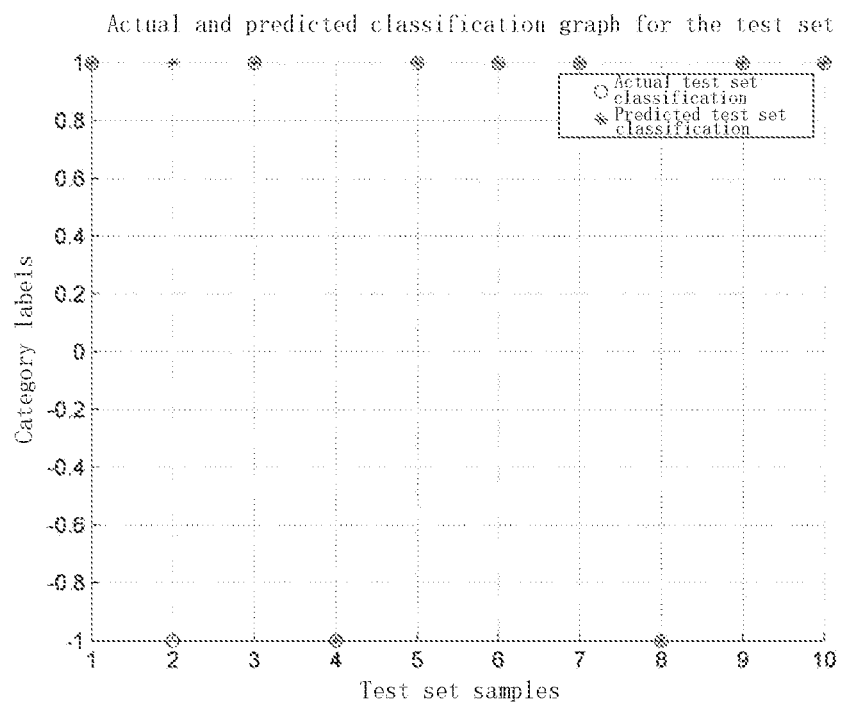
FIG. 4 is a graph comparing predicted results with actual results in Embodiment 1.
Figure 5:
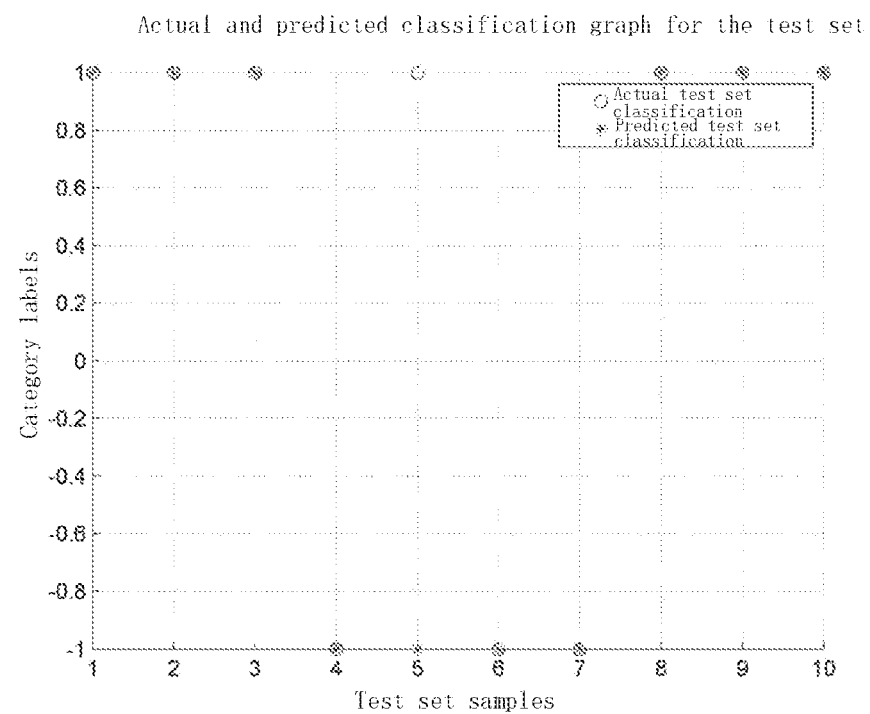
FIG. 5 is a graph comparing predicted results with actual results in Embodiment 2.
Figure 6:
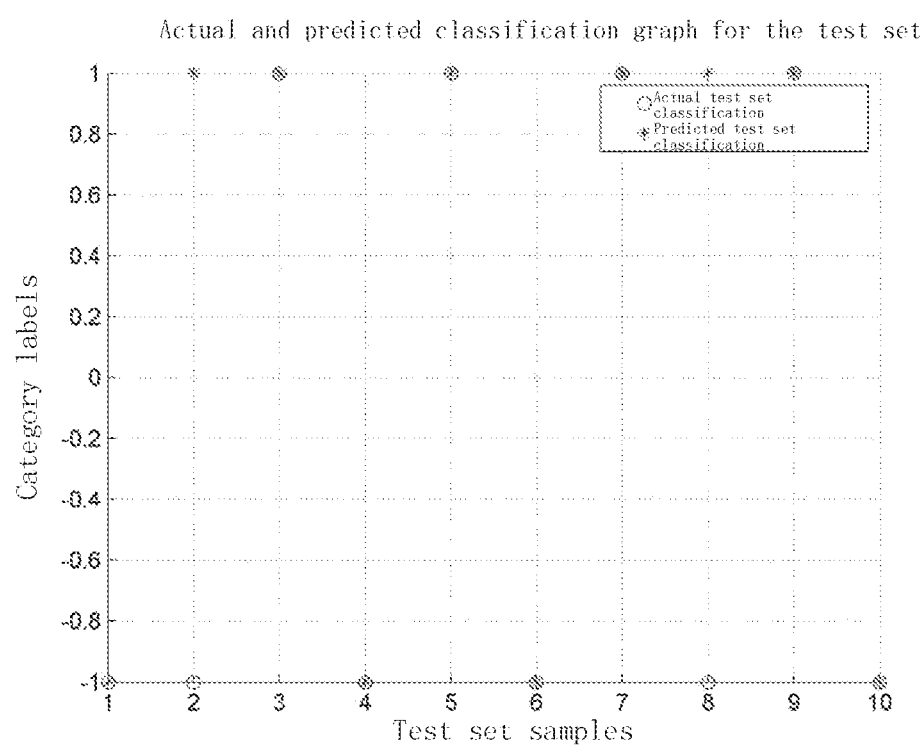
FIG. 6 is a graph comparing predicted results with actual results in Embodiment 3.

The present invention will now be further described with reference to specific embodiments, which are intended to be illustrative only and are not intended to limit the scope of the invention.

Embodiment 1

A method for predicting operation effectiveness of a decentralized sewage treatment facility by using a support vector machine is provided, and the specific steps are as follows.

(1) 164 decentralized sewage treatment facilities were selected in the Yangtze River Delta, the decentralized sewage treatment facilities including common $A^2O$ treatment facilities, such as a constructed wetland treatment facility, a sequencing batch reactor (SBR) treatment facility and an aeration filter facility, and the treatment scales varying from 5 t/d to 160 t/d; wherein all the facilities were composed of a regulation tank and a sewage treatment device; a lifting pump was installed at an water inlet end of the influent regulation tank; and an discharge outlet was set after the sewage treatment device. The rural domestic sewage treated by the above-mentioned facilities was composed of manure and urine sewage after septic tank treatment, kitchen sewage and laundry sewage, and the main pollutants thereof were COD, total nitrogen, ammonia nitrogen, total phosphorus and suspended solids. The influent conductivity and effluent conductivity of decentralized sewage treatment facilities were determined, and the specific determination methods were as follows.

After 15 min on starting up the lifting pump, water samples were collected in the regulation tank and the discharge outlet at the same time, and measured to obtain a first influent conductivity value and a first effluent conductivity value; after 15 minutes, a second influent conductivity value and a second effluent conductivity value were obtained by measurement; after 30 minutes, a third influent conductivity value and a third effluent conductivity value were obtained by measurement; and the values of the influent conductivity and the influent conductivity for the three times were averaged to obtain an average influent conductivity value and an average effluent conductivity value;

meanwhile, the concentrations of COD, ammonia nitrogen, total nitrogen, total phosphorus and suspended solids were determined in the water in the regulation tank and the discharge outlet of the decentralized sewage treatment facility for the three times, and the average values of the concentrations of the above-mentioned pollutants were calculated as the concentrations of COD, ammonia nitrogen, total nitrogen, total phosphorus and suspended solids in the detection stage, which was used for judging the operation effectiveness of the decentralized sewage treatment facilities and recording the operation effectiveness of the decentralized sewage treatment facilities corresponding to the determination of the electrical conductivity, namely, it was effective or ineffective;

if the removal rate of the decentralized sewage treatment facility for any one index of COD, ammonia nitrogen, total phosphorus and suspended solids in the rural domestic sewage was ≥20%, and there was no case that the effluent concentration of any two indexes of COD, ammonia nitrogen, total nitrogen and total phosphorus was greater than the influent concentration, it was an effective operation; otherwise, it was an ineffective operation.

(2) With the influent conductivity and effluent conductivity as input and the operation effectiveness of decentralized sewage treatment facilities as output, 154 groups were randomly selected from 164 groups of data as a training set, and a support vector machine was used for training to construct a prediction model for the operation effectiveness of decentralized sewage treatment facilities.

The specific steps were as follows.

Firstly, the influent conductivity and the effluent conductivity were respectively substituted into a mapminmax function for normalization processing, and then input into a support vector machine;

the formula for the mapminmax function was
$$y=(x-x_{min})/(x_{max}-x_{min}) \quad (1);$$

in formula (1), y was the measured data of the influent conductivity or the effluent conductivity after the normalization treatment; x was the measured data of the influent conductivity or the effluent conductivity before the normalization treatment; $x_{min}$ was a minimum value of x; $x_{max}$ was a maximum value of x; and the effective decentralized sewage treatment facility was marked as 1, and the ineffective decentralized sewage treatment facility was marked as −1.

In the training process, the support vector machine training on the training set was realized by Libsvm toolbox, and the prediction model for effluent standard situations of decentralized sewage treatment facility operation was constructed to optimize the penalty parameter c and the RBF kernel function parameter g;

The parameter optimization was based on K-CV cross-validation and grid optimization. Two-round optimization was performed on the penalty parameter c and the kernel function parameter g by using a SVMcgForClass function, thereby acquiring an optimal solution to the penalty parameter c and the kernel function parameter g.

The first round was rough selection, and the variation ranges of the penalty parameter c and the kernel function parameter g were $[2^{-10}, 2^{10}]$ and $[2^{-10}, 2^{10}]$ respectively; and the second round was fine selection, and the variation ranges of the penalty parameter c and the kernel parameter g were $[2^0, 2^{10}]$ and $[2^{-2}, 2^{10}]$, respectively.

(3) With the remaining 10 groups of data as prediction sets, the influent conductivity and effluent conductivity of the decentralized sewage treatment facilities to be predicted were input into the prediction model obtained in step (2) to obtain a predictive result.

Predictive results: the actual effectiveness of 9 facilities was the same as the predicted effectiveness, indicating that the prediction was correct; the actual effectiveness of 1 facility was different from the predicted effectiveness, indicating that the prediction was wrong; therefore, the prediction accuracy of the prediction set was 90%.

Embodiment 2

In this embodiment, the samples and prediction methods identical to those in Embodiment 1 were used, except that the judgment of effective operation was changed to "the removal rate of the decentralized sewage treatment facility for any one index of COD, ammonia nitrogen, total phosphorus and SS in the rural domestic sewage was ≥30%, and there was no case that the effluent concentration of any two indexes of COD, ammonia nitrogen, total nitrogen and total phosphorus was greater than the influent concentration".

Predictive results: the actual effectiveness of 9 facilities was the same as the predicted effectiveness, indicating that the prediction was correct; the actual effectiveness of 1 facility was different from the predicted effectiveness, indicating that the prediction was wrong; therefore, the prediction accuracy of the prediction set was 90%.

Embodiment 3

In this embodiment, the samples and prediction methods identical to those in Embodiment 1 were used, except that the judgment of effective operation was changed to "the removal rate of the decentralized sewage treatment facility for any one index of COD, ammonia nitrogen, total phosphorus and SS in the rural domestic sewage was ≥70%, and there was no case that the effluent concentration of any two indexes of COD, ammonia nitrogen, total nitrogen and total phosphorus was greater than the influent concentration".

Predictive results: the actual effectiveness of 8 facilities was the same as the predicted effectiveness, indicating that the prediction was correct; the actual effectiveness of 2 facility was different from the predicted effectiveness, indicating that the prediction was wrong; therefore, the prediction accuracy of the prediction set was 80%.

The invention claimed is:

1. A method for predicting operation effectiveness of a decentralized sewage treatment facility by using a support vector machine, comprising:
   (1) selecting a plurality of decentralized sewage treatment facilities as a training set; simultaneously collecting an influent conductivity and an effluent conductivity of the decentralized sewage treatment facilities in the training set; and recording operation effectiveness of the corresponding decentralized sewage treatment facilities;
   (2) training the training set by using the support vector machine, with the influent conductivity and effluent conductivity as input and the operation effectiveness of decentralized sewage treatment facilities as output, so as to construct a prediction model for the operation effectiveness of decentralized sewage treatment facilities; and
   (3) collecting the influent conductivity and effluent conductivity of the decentralized sewage treatment facilities to be predicted, and inputting same into the prediction model obtained in step (2) to obtain a predictive result.

2. The method of claim 1, wherein in step (1), the decentralized sewage treatment facility is at least one of an $A^2O$ treatment facility, a constructed wetland treatment facility, a SBR treatment facility, and an aeration filter treatment facility.

3. The method of claim 1, wherein:
   in step (1), the operation effectiveness is an effective operation or an ineffective operation;
   wherein a method for judging the effective operation and the ineffective operation includes that if the removal rate of the decentralized sewage treatment facility for any one index of COD, ammonia nitrogen, total phosphorus and suspended solids in the rural domestic sewage is ≥a percentage threshold, and there is no case that an effluent concentration of any two indexes of COD, ammonia nitrogen, total nitrogen and total phosphorus is greater than an influent concentration, it is judged an effective operation; otherwise, it is an ineffective operation; and
   the percentage threshold is 20%-70%.

4. The method of claim 1, wherein, in step (1),
   the influent conductivity is measured in a regulation tank of a decentralized sewage treatment facility, and the measurement time is 15 min after a lifting pump in the regulation tank is turned on;
   the effluent conductivity is measured in a discharge outlet of the decentralized sewage treatment facility, and is simultaneously measured with the influent conductivity;
   a determination method for the influent conductivity and the effluent conductivity includes collecting water samples in the regulation tank or in the discharge outlet to determine conductivity values; alternatively, the water in the regulation tank or in the discharge outlet is directly measured by an on-line conductivity meter.

5. The method of claim 4, wherein after 15 min on starting up the lifting pump, the influent conductivity and the effluent conductivity are respectively measured once; and thereafter the influent conductivity and the effluent conductivity are respectively measured once every 15 minutes for a total of 3-4 consecutive times, with an average value respectively taken as the influent conductivity value and the effluent conductivity value in a detection stage;
   the concentrations of COD, ammonia nitrogen, total nitrogen, total phosphorus and suspended solids in the regulation tank and the discharge outlet of the decentralized sewage treatment facility are respectively determined at the same time of detecting the influent conductivity and the effluent conductivity each time, and the average values of the concentrations of each pollutant in the influent and the effluent are calculated as the concentrations of COD, ammonia nitrogen, total nitrogen, total phosphorus and suspended solids in the detection stage, which are used for judging the operation effectiveness of the decentralized sewage treatment facility.

6. The method of claim 1, wherein in step (2), the influent conductivity and the effluent conductivity are respectively substituted into a mapminmax function for normalization treatment to [0, 1], and then input into the support vector machine;

the formula for the mapminmax function is $y=(x-x_{min})/(x_{max}-x_{min})$ (1);

in formula (1), y is the measured data of the influent conductivity or the effluent conductivity after the normalization treatment; x is the measured data of the influent conductivity or the effluent conductivity before the normalization treatment; $x_{min}$ is a minimum value of x; $x_{max}$ is a maximum value of x; and
   the effective decentralized sewage treatment facility is marked as 1, and the ineffective decentralized sewage treatment facility is marked as −1.

7. The method of claim 1, wherein in step (2), a model is trained by using a Libsvm toolbox, the training comprising optimization of a penalty parameter c and a RBF kernel parameter g; and
   the optimization comprises performing two-round optimization on the penalty parameter c and the kernel function parameter g by using a SVMcgForClass function, thereby acquiring an optimal solution to the penalty parameter c and the kernel function parameter g.

* * * * *